April 20, 1926.  S. KAPLAN  1,581,348
WHEEL
Filed August 18, 1924
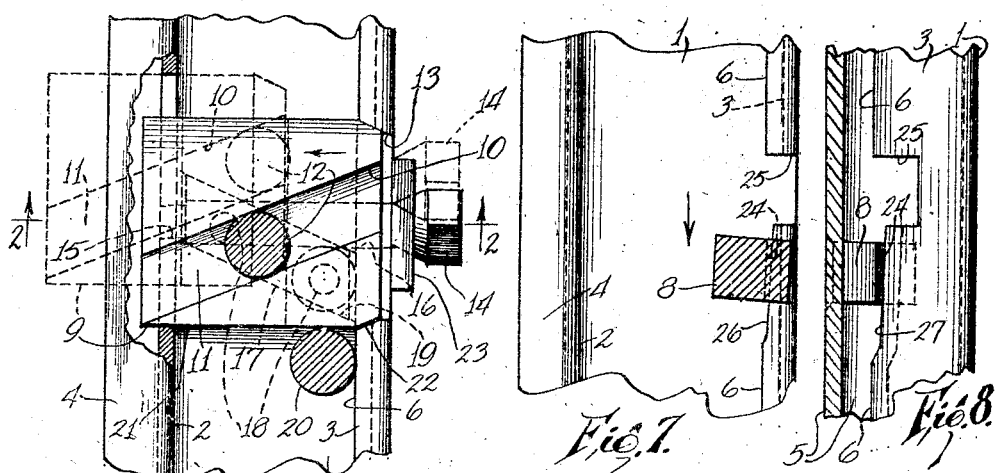
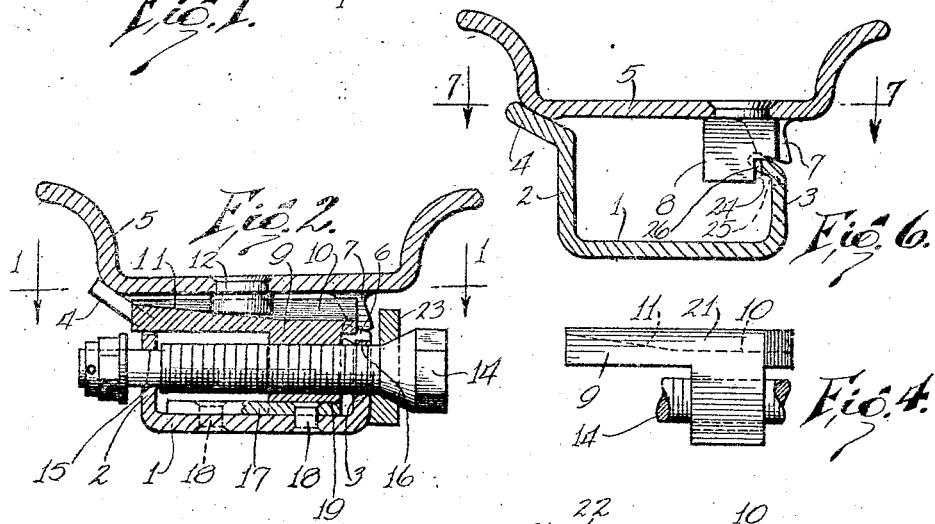
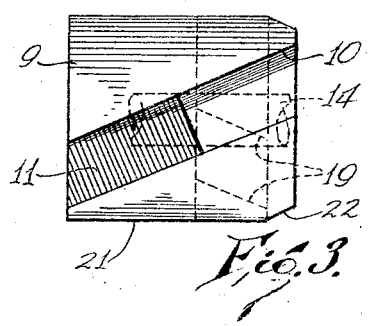
INVENTOR
S. KAPLAN
BY
ATTORNEYS Patented Apr. 20, 1926.

1,581,348

UNITED STATES PATENT OFFICE.

SAMUEL KAPLAN, OF MONROE, LOUISIANA.

WHEEL.

Application filed August 18, 1924. Serial No. 732,835.

*To all whom it may concern:*

Be it known that I, SAMUEL KAPLAN, a citizen of the United States, and a resident of Monroe, in the parish of Ouachita and State of Louisiana, have invented a new and useful Improvement in Wheels, of which the following is a full, clear, and exact description.

My invention relates to improvements in wheels, and it consists in the combinations, constructions, and arrangements herein described and claimed.

An object of my invention is to provide a wheel in which positive means is provided for moving the rim into locked position and also for moving the rim into unlocked position whereby the rim may be easily removed from the felly.

A further object of my invention is to provide a wheel in which the positive means for moving the rim into locked position also wedges the rim upon the felly, thus preventing movement of the rim with respect to the felly, which is generally the cause of squeaking of the rim.

A further object of my invention is to provide a wheel which makes use of a number of locking devices disposed about the rim, these devices being moved into operative engagement with the felly when the means for positive movement of the rim is actuated.

A further object of my invention is to provide a wheel which is simple in construction, durable and efficient for the purpose intended and which is not likely to get out of order easily.

Other objects and advantages will appear in the following specification, and the novel features of the invention will be particularly pointed out in the appended claims.

My invention is illustrated in the accompanying drawings, forming a part of this application in which:

Figure 1 is a section along the line 1—1 of Figure 2,

Figure 2 is a section along the line 2—2 of Figure 1,

Figures 3 to 5 inclusive are views of the rim locking member,

Figure 6 is a section showing the construction of one of the locking pins,

Figure 7 is a section along the line 7—7 of Figure 6, and

Figure 8 is a side elevation of Figure 7.

In carrying out my invention I provide a felly 1 which has two outwardly extending sides 2 and 3. The side 2 has an outwardly extending flange 4 which is adapted to contact with the inner surface of a rim 5. The side 3 has a flange 6 which contacts with a rib 7 that is carried by the rim 5. In this manner the rim 5 is supported by the felly 1.

In the present form of the device I provide a novel means for positively moving the rim with respect to the felly so as to lock the rim to the felly, and I also provide a number of locking pins which are disposed about the rim and which are adapted to engage with the flange 6 of the felly so as to lock the rim to the felly. It is obvious that I may provide any number of pins or locking members 8, see Figure 6. I have found that three of such members 8 disposed 90 degrees apart is a sufficient number to lock the rim to the felly. A locking plate 9, to be more specifically described hereinafter, works in co-operation with the pins 8 and also aids in locking the rim to the felly. When the rim is mounted on the wheel, this plate 9 will be equally spaced from the two adjacent pins 8 which are diametrically opposite each other when the ninety degree spacing is employed. The members 8 and the plate 9 are preferably evenly spaced around the rim. The plate 9 and the pins 8 are the means employed for moving the rim with respect to the felly and for locking the rim thereto.

The special construction of the plate 9 is clearly shown in Figures 3 to 5 inclusive, and the operation of this plate is clearly shown in Figures 1 and 2. In Figures 3 and 4 it will be noted that the plate 9 has a groove 10 which extends at an angle with respect to the longitudinal axis of the plate. This groove has a tapered portion 11 which is adapted to cause the pin 12 to move radially outward with respect to the plate 9 so as to wedge the rim firmly in place with respect to the felly 1. The pin 12 is carried by the rim 5 and is adapted to enter a recess 13 in the side 3 of the felly when the rim is applied to the felly. The valve of the tire is disposed diametrically opposite the pin 12 and is first inserted in an opening in the felly 1, (not shown), before the pin 12 is moved in the direction of the arrow shown in Figure 1 into the dotted line position.

The plate 9 is adapted to be moved from the full line position shown in Figure 1 to the dotted line position, this being accomplished by means of a bolt 14. The bolt 14 is slidably received in elongated slots 15 and 16 in the sides 2 and 3, respectively. The slots 15 and 16 permit the bolt 14 to move from the full line position into the dotted line position shown in Figure 1 during the time the plate 9 is being moved into the dotted line position. It will be noted from Figure 1 that the plate 9 not only moves in the direction of the arrow with respect to the felly 1 when the bolt 14 is actuated, but also moves slightly around the felly, as clearly shown in Figure 1. This movement is accomplished by means of a guide member 17 that is riveted to the felly 1 by means of rivets 18 and is inclined at an angle with respect to the axis of the bolt 14. The plate 9 has a groove 19 which is also inclined and which receives the guide 17. When the bolt 14 is actuated the plate 9 will be moved over the guide 17 which will cause the plate to move into the dotted line position shown in Figure 1.

When assembling the rim on the felly the plate is disposed in the dotted line position so as to permit the pin 12 to be moved into the dotted line position and to be received in the groove 10. When the bolt 14 is actuated it will move the plate in the direction reverse to the arrow shown in Figure 1 and will cause the pin 12 to be moved into the full line position. I have found that by inclining the groove 10 and the groove 19 so that their axes cross each other the pin 12 may be moved so as to lock the rim 5 in place, and will not create a binding action on the pin 12 during this movement. By disposing the grooves 10 and 19 in the manner described, the pin 12 may be moved a relatively great distance while the plate 9 at the same time is moving through a much smaller distance.

The rim 5 also carries a pin 20 which is disposed close to the pin 12 and which is adapted to be engaged by the side 21 of the plate 9. Figure 1 shows the position of the pin 20 when the rim is first received by the felly. This is shown in dotted lines. The side 21 adjacent to the front of the plate 9 is tapered at 22 so as to engage with the pin 20 and causes the pin to be moved into the full line position. The pin 20 enters the recess 13 with the pin 12 but when moved into the full line position is disposed in back of the wall of the recess and bears against the edge of the flange 6. It will therefore be seen that the pins 12 and 20 lock the portion of the rim disposed adjacent thereto from lateral movement with respect to the felly and from vertical movement. The bolt 14 carries a washer 23 which bears against the outer surface of the side 3 and acts as a bearing for the bolt when the bolt is moving the plate 9 in a direction reverse to the arrow shown in Figure 1. The washer 23 also acts as an additional locking means for the rim 5.

Figures 6 to 8 inclusive show the special construction of the locking pins 8. These pins are carried by the rim 5 in the same manner as the pins 12 and 20. The pins 8, however, have cut away portions 24 which bear against the edge of the flange 6. In Figures 7 it will be noted that the felly 1 is provided with a recess 25 that receives the pin 8. When the pin 12 is moved from the dotted line position to the full line position shown in Figure 1 the pins 8 will be moved from a position in alignment with the recess 25 into the position shown in Figure 7. A portion 26 of the flange 6 is inclined adjacent to the recess 25 and acts as a cam surface for the pin 8. It will be seen that when the pin 8 is moved in the direction of the arrow shown in Figure 7 it will bear against the surface 26 and will therefore lock the rim against lateral movement with respect to the felly. It will also be noted from Figure 8 that the outer edge 27 of the portion 26 is also tapered so as to cause the pin 8 to act as a wedge between the rim and the felly. It will therefore be seen that the pin 8 has two cam edges to contact with and therefore securely locks the rim to the felly and prevents lateral and vertical movement of the rim with respect to the felly.

From the foregoing description of the various parts of the device the operation thereof may be readily understood. As heretofore stated, the rim is disposed on the wheel or felly in such a manner that the valve, not shown, is first inserted into the valve opening in the felly, not shown. The portion of the rim disposed diametrically opposite to the valve is then swung into place, this portion carrying with it the pins 12 and 20. The pins 12 and 20 enter the recess 13 when the pins 8 enter the recesses 25. The rim is now in a position to be rotated slightly with respect to the felly so as to lock the rim to the felly. This is accomplished by means of rotating the bolt 14 so as to cause the plate 9 to move from the dotted line position into the full line position. This operation has been clearly set forth and it will therefore be sufficient to state that the pins 12 and 20 are moved into the full line position shown in Figure 1, while the pins 8 are moved into the position shown in Figures 7 and 8. The inclined portion 11 of the groove 10 and the cam edge 27 cause the pins 12 and 8 to wedge themselves between the felly and rim so as to lock the rim against radial movement with respect to the felly. The cam edges 26 tend to move the rim in the direction of the arrow shown in Fig. 1 which causes the rim to bear against the flange 4. It will therefore be seen that this construction prevents lateral movement of the rim with respect to the felly. One of the novel advantages of this device lies in the fact that the rim when moved into unlocked position is freed at all points from the felly and is loose enough to be freely and easily removed from the felly. This is due to the special construction of the inclined portion 11 of the groove 10 and the cam edges 26 and 27 of the flange 6. The rim is positively moved into locked or unlocked position by merely rotating the bolt 14 in one position or the other. The device is simple in construction and may be subjected to constant wear without there being any likelihood of it getting out of order.

I claim:

1. The combination of the felly of a wheel having an inner flange having a flaring edge and an outer flange provided with an inwardly curved edge and with notches, and a rim adapted to rest on said flaring edge of the inner flange and being provided with lugs adapted to pass through said notches when the rim is slipped onto the felly, the inwardly curved edge of the outer flange having inclined portions adjacent the notches adapted to be engaged by said lugs to force the rim onto said flaring edge and to place said rim under radial pressure when the rim is rotated on the felly.

2. The combination of the felly of a wheel having an inner flange having a flaring edge and a rim adapted to be seated on said edge, said felly and rim having engaging surfaces adapted to force the rim onto said edge when rotated on the felly, a plate transversely movable between the felly and rim and having grooves in both its sides oppositely inclined to an axial plane, projections on the rim and felly extending into the grooves in the plate, and means to move the plate axially of the wheel to rotate the rim on the felly.

3. The combination of the felly of a wheel having an inner flange having a flaring edge and a rim adapted to be seated on said edge, said felly and rim having engaging surfaces adapted to force the rim onto said edge when rotated on the felly, a plate transversely movable between the felly and rim and having grooves in both its sides oppositely inclined to an axial plane, projections on the rim and felly extending into the grooves in the plate, and means to move the plate axially of the wheel to rotate the rim on the felly, said engaging surfaces on the rim and felly adapted to exert radially outward pressure on said rim independently of the pressure of said flaring edge on the rim.

SAMUEL KAPLAN.